United States Patent [19]

Litman

[11] 4,139,268
[45] Feb. 13, 1979

[54] STOP SYSTEM FOR THE FOCUS OF AN OPTICAL INSTRUMENT

[75] Inventor: Alan Litman, Pittsburgh, Pa.

[73] Assignee: Smith & Wesson Chemical Company, Inc., Pittsburgh, Pa.

[21] Appl. No.: 806,204

[22] Filed: Jun. 13, 1977

[51] Int. Cl.² ........................... G02B 7/04; G02B 7/10
[52] U.S. Cl. ........................................ 350/255; 350/79
[58] Field of Search ................... 350/255, 187, 78–79, 350/84, 77, 44, 46–47, 195

[56] References Cited

U.S. PATENT DOCUMENTS

| | | | |
|---|---|---|---|
| 2,184,351 | 12/1939 | Langsner | 350/255 |
| 3,970,368 | 7/1976 | Von Belvard | 350/187 |

Primary Examiner—John K. Corbin
Assistant Examiner—Wm. H. Punter
Attorney, Agent, or Firm—Patrick J. Walsh

[57] ABSTRACT

Disclosed is a stop system for the focus of an optical instrument having a housing carrying an objective lens. The housing has an outer body tube slidably containing a coaxial inner tube forming the housing for an imaging device. A focusing nut is secured to the inner tube against axial movement and is screw threaded to the outer tube whereupon rotation of the nut causes relative axial movement between the inner and outer tubes to focus the imaging device and objective lens relative to one another. The focusing nut has a reduced diameter short tube supporting a plurality of cascade rings. A support ring is carried by the inner tube adjacent the end of the support tube. The focusing and cascade rings carry axially projecting lugs at predetermined circumferential positions thereabout while the cascade and stop rings carry shoulders at predetermined circumferential positions thereabout. The lugs and shoulders cooperate one with the other to limit the number of revolutions of the focusing ring to a predetermined number of revolutions substantially proportional to the total number of cascade rings plus one.

20 Claims, 7 Drawing Figures

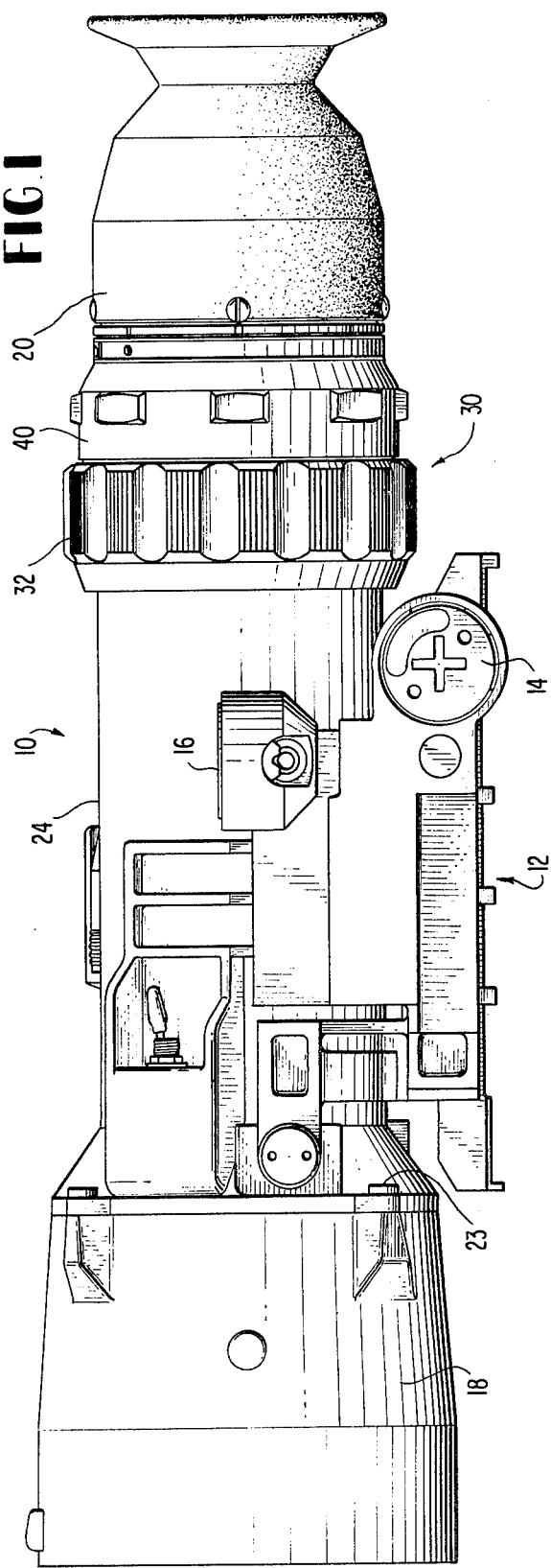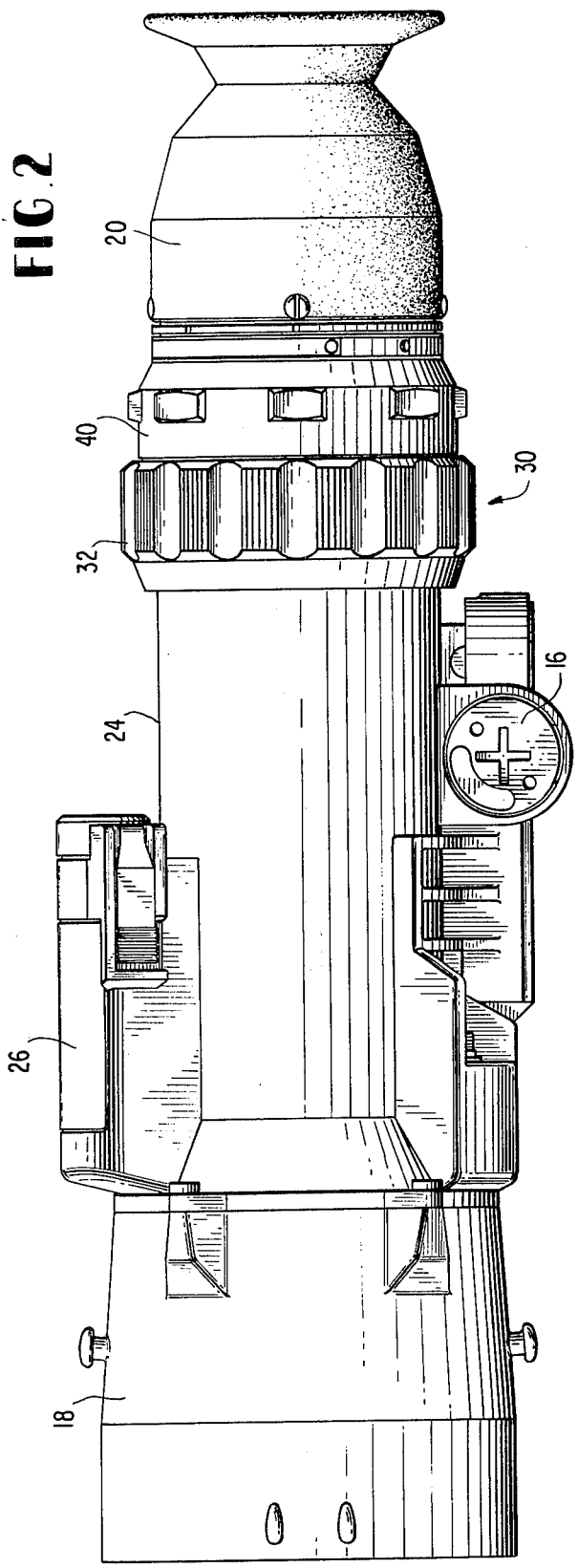

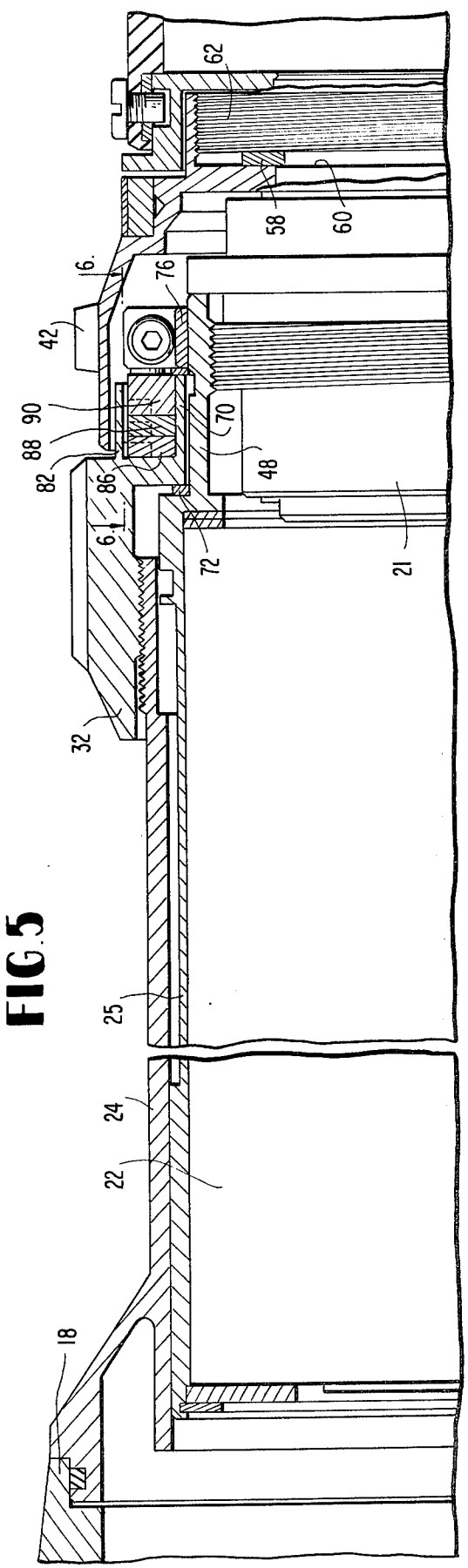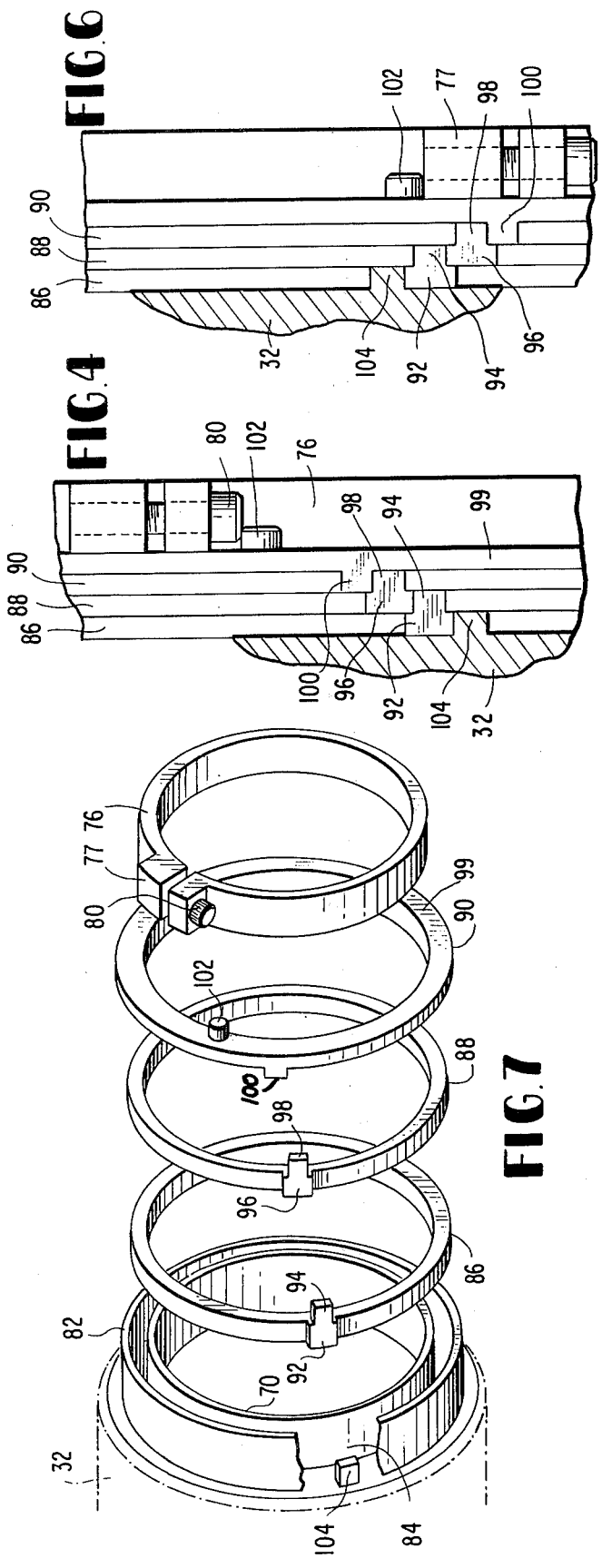

STOP SYSTEM FOR THE FOCUS OF AN OPTICAL INSTRUMENT

The present invention relates to optical instruments and particularly relates to a stop system for the focus of an optical instrument having an objective lens and an imaging device wherein the focusing ring is provided with a range of movement to enable effective fine adjustment focusing but which range is uniquely limited to a predetermined number of revolutions of the focusing ring to prevent jamming.

In many optical instruments, for example, a night vision scope for use on a rifle, lenses having a long focal length are desirable. This requires a large range of adjustment or long focal stroke. Coarse threads, of course, can provide a large range of adjustment but these lack the capability of providing for fine focusing adjustment. Fine threads are often used to achieve fine focusing adjustment. For example, to achieve fine focusing adjustment, a sixteen pitch thread may be used and this provides a one-sixteenth inch focus stroke for each revolution of the focusing ring. For short focal length lenses, fine threads have proven satisfactory. However, a large number of revolutions of the focusing ring is required to obtain the desired longer focal stroke for lens systems of longer focal length.

Optical instruments are fitted with axial stops for limiting the focal stroke of the instrument's focusing ring. Axial stops are susceptible to occasional jamming when the focusing ring engages the axial stop with excessive force--much like a jar lid fastened too tightly. Such jamming reduces the effectiveness of the instrument. Therefore, radial stops are preferred to axial stops. However, in the instance of a typical radial stop consisting of two round pins, it is obvious that the diameter of each radial pin must be slightly less than one-half the linear distance advanced in one revolution of the focusing mechanism. In using a 16-pitch thread, each radial pin must be less than one-thirty-second inch in diameter to accommodate more than one revolution of the focusing mechanism. Such radial stops would be too small for practical usage. Moreover, such radial stop systems have proven satisfactory for short focal length lens systems wherein one revolution of the focusing ring provides sufficient range of adjustment. However, for long focal length lenses, a longer range of focal stroke is necessary and consequently there has arisen a need to provide a stop system which is not limited to one revolution of the focusing ring yet which effectively provides for fine adjustment while preventing jamming at the opposite ends of the range of movement of the focus.

Accordingly, it is a primary object of the present invention to provide a novel and improved stop system for the focus of an optical instrument.

It is another object of the present invention to provide a novel and improved stop system for the focus of an optical instrument particularly for use in providing fine focusing adjustment in optical instruments having long focal length lenses.

It is still another object of the present invention to provide a novel and improved stop system for the focus of an optical instrument having a focusing ring rotatable for a plurality of revolutions with an effective, jam-proof, stop system at each of the opposite ends of its range of movement.

It is a further object of the present invention to provide a novel and improved stop system for the focus of an optical instrument having the foregoing characteristics and which is simple and economical in construction and easy to assemble.

It is a related object of the present invention to provide a night vision rifle scope having a relatively movable objective lens and imaging device and a focusing ring enabling fine relative adjustment of the objective lens and imaging device and further including a novel system for uniquely stopping the focusing ring at the opposite ends of its range of movement to effectively prevent jamming.

To achieve the foregoing and other objects and advantages in accordance with the purposes of the present invention, as embodied and described herein, the stop system for the focus of an optical instrument having a lens and an imaging device in accordance with the present invention comprises a first element for carrying one of the lens and imaging device; a second element for carrying the other of the lens and imaging device and movable relative to the first element; means cooperable between the focusing ring, the first element, and the second element for moving the second element relative to the first element in response to rotation of the focusing ring; and means including a plurality of cascade rings, a stop ring and the focusing ring for limiting the number of revolutions of the focusing ring in at least one circumferential direction to a predetermined number of revolutions substantially proportional to the total number of cascade rings plus one.

Preferably, a plurality of cascade rings are provided and the limiting means limits the number of revolutions of the focusing ring in one circumferential direction to a maximum number of revolutions substantially equal to the total number of cascade rings plus one. Particularly, the limiting means includes a lug carried by each of the cascade rings and one of the focusing ring and stop ring at predetermined circumferential positions thereabout and projecting therefrom in like axial directions. A shoulder is carried by each of the cascade rings and the other of the focusing ring and stop ring at a predetermined circumferential position thereabout for engagement with the lug carried by the axially adjacent ring, the rotation of the focusing ring in one circumferential direction causing, upon substantially each revolution of the focusing ring, successive engagement between the lug and shoulder of each pair of axially adjacent rings whereby the first ring in each pair thereof rotates the second ring thereof upon such engagement and continued rotation of the focusing ring.

The foregoing and other objects and advantages of the present invention will become more apparent upon reference to the following specification, appended claims and drawings wherein:

FIG. 1 is a side elevational view of an optical instrument containing a stop system for its focus constructed in accordance with the present invention;

FIG. 2 is a plan view of the optical instrument illustrated in FIG. 1;

FIG. 4 is an enlarged fragmentary cross-sectional view thereof taken generally about on line 4—4 in FIG. 3;

FIG. 5 is a view similar to FIG. 3 illustrating the imaging device in its fully retracted position;

FIG. 6 is an enlarged fragmentary cross-sectional view taken about line 6—6 of FIG. 5; and FIG. 7 is a fragmentary perspective view illustrating the stop system hereof with parts in exploded juxtaposition relative to one another.

Figure 3:
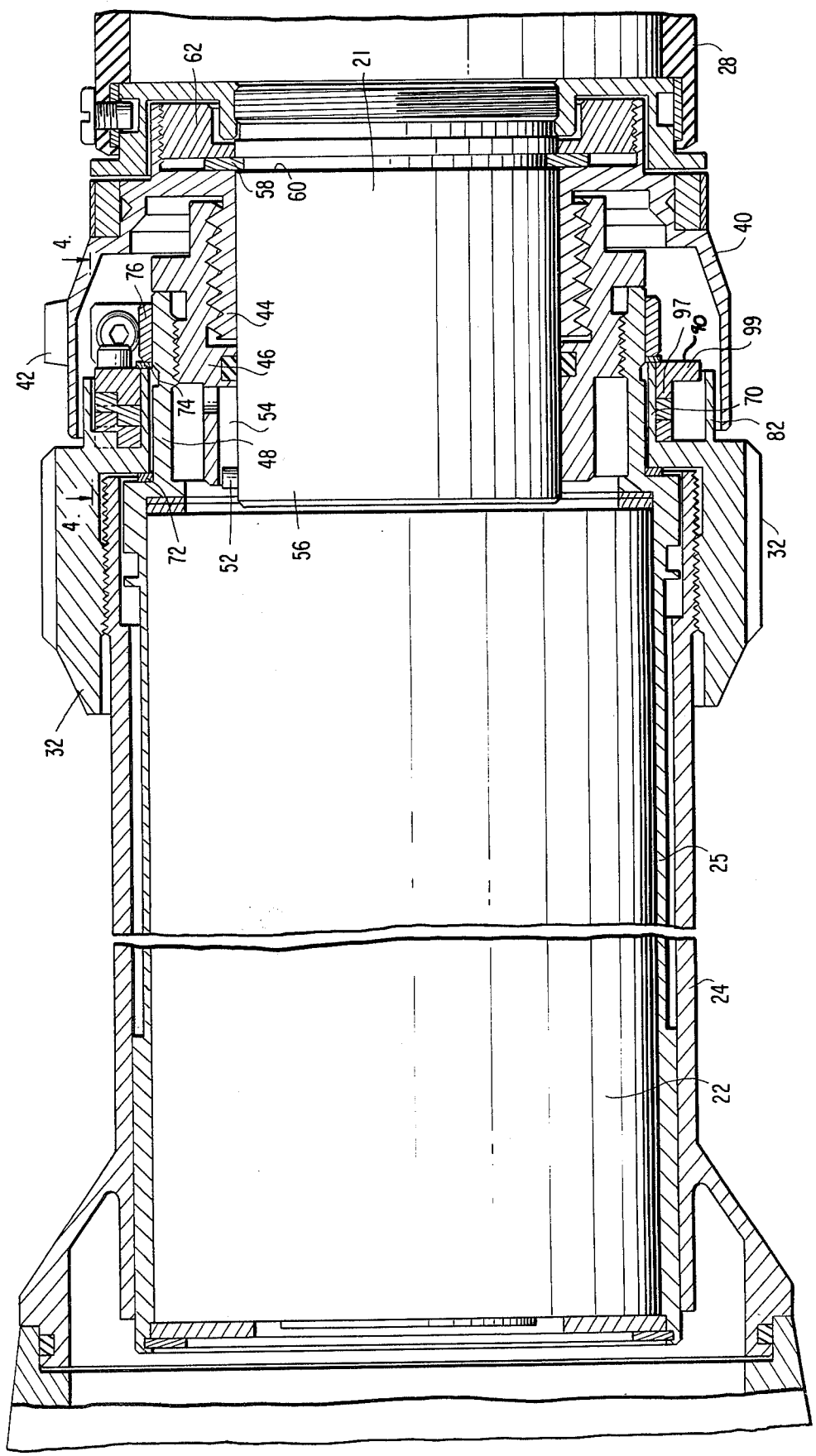
FIG. 3 is an enlarged fragmentary longitudinal sectional view of the optical instrument illustrated in FIG. 1 with parts broken out for clarity and illustrating the imaging device in an extended position.

Reference will now be made in detail to the present preferred embodiment of the invention, an example of which is illustrated in the accompanying drawings.

Referring now to FIGS. 1 and 2, there is illustrated an optical instrument, in this instance a night vision scope, generally designated 10, having a mounting, generally designated 12, whereby the scope 10 can be mounted on a rifle, not shown. Mounting 12 includes mechanisms providing for adjustment of the scope both in azimuth and elevation relative to the rifle. These adjustment mechanisms, however, form no part of the present invention and only the azimuth and elevation adjusting screws 14 and 16, respectively, are illustrated. Generally, scope 10 includes an objective lens 18 at one end and an eyepiece 20 at its opposite end, an ocular 21 (FIGS. 3 and 5) being carried by the scope just forwardly of eyepiece 20. Intermediate objective lens 18 and ocular 21 is an imaging device 22, for example an intensifier tube (FIG. 3) or a photo-multiplier powered by a battery, not shown, disposed in a battery housing 26 carried by a body tube 24. Imaging device 22 is confined with a cylindrical housing 25 which is telescopically received in body tube 24. Objective lens 18 is secured to body tube 24 by screws 23. The focusing system for optical instrument 10 is generally designated 30 and includes a focusing ring 32 which is internally threaded to external threads about the inner end of body tube 24 as best illustrated in FIGS. 3 and 5.

In the general usage of the instrument, scope 10 is mounted on the rifle or other support and adjusted in azimuth and elevation as necessary. Rotation of focusing ring 32 causes, in a manner to be explained in detail hereinafter, intensifier tube 22, ocular 21 and eyepiece 20 to move axially relative to the objective lens 18, body tube 24, and mount 12, as a comparison of FIGS. 3 and 5 will readily illustrate. Ocular 21 may also be axially adjusted relative to intensifier tube 22. To accomplish this, an ocular adjusting ring 40, which is externally knurled at 42, has an internal hub 44 which is coarsely threaded internally about a collar 46. Collar 46 is externally threaded and secured to a slightly reduced diameter hub 48 at the inner end of the cylindrical housing 25 of intensifier tube 22. Ocular 21 is disposed in a cylindrical housing 56 which is axially slidable relative to collar 46. Ocular 21 includes a radial projection 52 axially movable in a slot 54 formed in the forward end of collar 46. A retainer ring 58 is disposed in a groove 60 in ocular housing 56 and is clamped to the adjusting ring 40 by a threaded clamp ring 62.

Consequently, by rotating ring 40, ocular 21 may be advanced or retracted relative to collar 46. Hence its axial position relative to intensifier tube 22 can be adjusted as desired. Since the ocular and its mounting do not form any part of the present invention, further description thereof is not believed necessary.

Turning now to the focusing system 30, focusing ring 32 carries a reduced diameter, rearwardly extending, support tube 70 which overlies a portion of sleeve 48 at the rearward end of the intensifier tube housing 25. Focusing ring 32 is prevented from axial movement relative to sleeve 48 of the intensifier tube housing 25 by a pair of retaining bearing rings 72 and 74 at opposite ends of support tube 70 and a stop ring 76. Stop ring 76 is clamped to sleeve 48 and retains rings 72 and 74 and support tube 70 against axial movement. Focusing ring 32 is, of course, rotatable relative to sleeve 48.

As best illustrated in FIG. 7, stop ring 76 constitutes a split ring having a pair of radially outwardly directed lugs 77 screw threaded one to the other by means of bolt 80 whereby ring 76 can be releasably clamped to sleeve 48. Spaced radially outwardly of and concentric with support tube 70 is a cylindrical outer wall 82 which defines with support tube 70 a rearwardly opening annular recess 84 for receiving the cascade rings as will now be explained.

Turning now to FIG. 7, focusing ring 32 is illustrated with the annular recess 84 disposed to receive a plurality of cascade rings 86, 88, and 90. It will be appreciated that the number of cascade rings shown is illustrative only and that one, two or more than the three cascade rings illustrated could be employed in accordance with the present invention depending upon the necessary range of axial adjustment and the desired number of revolutions of the focusing ring necessary to achieve such axial adjustment as will become clear from the ensuing description. At a predetermined circumferential location thereabout, cascade ring 86 carries a radially outwardly projecting shoulder 92 and a lug 94. Lug 94 projects in an axially rearward direction from shoulder 92. Similarly, cascade ring 88 carries a radially outwardly projecting shoulder 96 and a lug 98 at a predetermined circumferential location thereabout. Lug 98 likewise projects axially rearwardly from shoulder 96. As best illustrated in FIG. 3, the rearmost cascade ring 90 has an annular flange 99 of reduced axial extent extending radially outwardly from base portion 97. Base portion 97 and flange 99 of cascade ring 90 thus define a forwardly facing step which, at a predetermined circumferential location about ring 90, carries a shoulder 100. On the opposite side of cascade ring 90, i.e., its rearmost side, there is provided an axially projecting lug or pin 102 at a like radial location as the head of bolt 80 on stop ring 76. Also illustrated in FIG. 7 is an axially projecting lug 104 disposed within annular recess 84 of the focusing ring 32 and at a like radial extent as shoulder 92.

In assembling the cascade rings within the annular recess 84 of focusing ring 32, it will be appreciated that the shoulders 92, 96, and 100 lie on like circumferences. Therefore, when the cascade rings 86, 88, and 90 are axially butted one against the other as illustrated in FIGS. 3 and 5, the shoulders and stops of next adjacent rings lie circumferentially staggered relative to one another. That is, when ring 86 is disposed in recess 84 about support tube 70, shoulder 92 is circumferentially staggered relative to lug 104. Likewise, when cascade ring 88 is butted against cascade ring 86, shoulder 96 is circumferentially staggered relative to lug 94. Similarly, when cascade ring 90 is butted against cascade ring 88, shoulder 100 is circumferentially staggered relative to lug 98. Also, the bolt 80 and pair of lugs 77 on stop ring 76 are circumferentially staggered relative to lug 102 when the stop ring 76 is applied about hug 48. In disposing the cascade rings in annular recess 84, it will be appreciated that the rings are freely rotatable about support tube 70 provided the shoulder or lug of any one ring does not engage the respective lug or shoulder of the next adjacent ring. Also, retainer ring 74 prevents the cascade rings from being displaced axially from support tube 70 while enabling the cascade rings to freely rotate within the constraints noted above and which constraints will now be described in connection with the detailed description of the operation of the stop system hereof.

Referring now to FIG. 4, which illustrates the position of the elements of the stop system hereof when the intensifier tube is extended relative to the body tube 24, as illustrated in FIG. 3, it will be appreciated that lug 104 on the focusing ring 32 butts shoulder 92 on cascade ring 86. Lug 94 of cascade ring 86 butts shoulder 96. Similarly, lug 98 of cascade ring 80 butts shoulder 100 of cascade ring 90. Lug 102 of cascade ring 90 also butts the head of bolt 80 on stop ring 76. Since stop ring 76 is clamped to sleeve 48 against rotation, and since the intensifier tube housing 25 carrying sleeve 48 is prevented from rotating relative to body tube 24, for example, by a splined arrangement, it will be appreciated that further counterclockwise rotation of focusing ring 32, looking from left to right in FIG. 3, is prevented. Consequently, focusing ring 32, in FIG. 4, lies at one end of its range of adjustment with the intensifier tube and objective lens system disposed in close axial proximity relative to one another.

To effect focusing adjustment and displace the intensifier tube rearwardly away from the objective lens, (since the body tube is fixed to the mount) focusing ring 32 is rotated in the opposite direction, i.e., clockwise looking from left to right in FIGS. 3 and 5. The internally threaded focusing ring consequently displaces intensifier tube 22, ocular 21 and eyepiece 20 rearwardly as it is threaded about the externally threaded body tube housing 24. It will be appreciated that rotation of focusing ring approximately one revolution displaces lug 104 from the side of shoulder 92 of cascade ring 86 illustrated in FIG. 4 to the opposite side of shoulder 92. Continued rotation of focusing ring 32 causes lug 104 to engage shoulder 92 and hence carry cascade ring 86 for rotation with focusing ring 32 on the latter's second rotary excursion from its extreme stop position. This action displaces lug 94 from the side of shoulder 96 illustrated in FIG. 4, through a full revolution, to the opposite side of shoulder 96 as illustrated in FIG. 6. Consequently, focusing ring 32 has completed two revolutions while cascade ring 86 has completed one revolution. Further continued rotation of focusing ring 32 causes lug 94 to engage shoulder 96 and hence carry cascade ring 88 for rotation with focusing ring 32 on the latter's third rotary excursion from its extreme stop position. Continued rotation of focusing ring 32 on its third rotary excursion carries lug 98 substantially a full revolution to the opposite side of shoulder 100 of cascade ring 90. It will be appreciated that focusing ring 32 has now been rotated substantially three complete revolutions while cascade ring 86 has been rotated approximately two complete turns, and cascade ring 88 has been rotated approximately one complete turn. Upon further rotation of focusing ring 32, lug 98 engages the opposite side of shoulder 100 and hence carries cascade ring 90 for rotation with focusing ring 32 on the latter's fourth rotary excursion. Continued rotation of focusing ring 32 carries lug 102 into engagement against lug 77 on stop ring 76. Upon this engagement, focusing ring 32 cannot be further rotated in that direction since all cascade rings are prevented from rotation due to the engagement of lug 102 with lug 77 on stop ring 76 and the lugs of the focusing and cascade rings with the respective shoulers. This provides a positive stop at the opposite end of the range of adjustment illustrated in FIG. 5.

To return the focusing system from the end of the range of adjustment illustrated in FIG. 5 to the opposite end of its range of adjustment illustrated in FIG. 3, focusing ring 32 is rotated in the opposite direction. Thus, focusing ring 32 rotates a full revolution until lug 104 engages the opposite side of shoulder 92. Further rotation of focusing ring 32 rotates cascade ring 86 a substantially complete revolution until lug 94 engages shoulder 96 of cascade ring 88. Further rotation of focusing ring 32 rotates both cascade rings 86 and 88 and, upon completing substantially another revolution, lug 98 engages shoulder 100 of cascade ring 90. Further rotation of focusing ring 32 rotates the three cascade rings until stop 102 engages the head of bolt 80. Since stop ring 90 is secured against rotation to sleeve 48 further rotation of focusing ring 32 is prevented and the focusing ring 32 is thus positively stopped at the opposite end of its range of adjustment.

It will be appreciated that, by the foregoing arrangement, a sixteen pitch thread can be provided between the focusing nut and the body tube whereby a very fine focusing adjustment of the lens and intensifier tube can be effected. In the preferred embodiment, four complete revolutions of the focusing ring 32 are provided. Consequently, by using 16 pitch threads, a full quarter inch of relative movement between the objective lens and the intensifier tube is afforded upon four complete revolutions. The stop system described and illustrated herein thus serves to limit the number of revolutions of focusing ring and to prevent jams at the opposite ends of its range of adjustment.

From the foregoing description, it is apparent that the number of revolutions the focusing ring can make is substantially proportional to the total number of cascade rings plus one. While it will be appreciated that there is an arc subtended by the circumference of each shoulder and lug, the number of revolutions to which the focusing ring is limited is substantially equal to the total number of cascade rings plus one. Should a very large number of cascade rings be employed, for example eight or nine, the number of revolutions of the focusing ring throughout its range of adjustment would be less than the total number of cascade rings plus one depending upon the combined arcuate extent of the lugs and shoulders.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A stop system for the focus of optical instrument having a pair of lenses and an imaging device comprising:
a first element for carrying one of the lens;
a second element for carrying the other of the lens and imaging device and movable relative to said first element;
a focusing ring carried by the instrument;
means cooperable between said focusing ring, said first element and said second element for moving said second element relative to said first element in response to rotation of said focusing ring; and means including a plurality of rotatable cascade rings, a stop ring, and said focusing ring, each in coaxial alignment with the other, for limiting the number of revolutions of said focusing ring in at least one circumferential direction to a predetermined number of revolutions substantially proportional to the total number of cascade rings plus one.

2. A stop system according to claim 1 wherein said limiting means limits the number of revolutions of said focusing ring in said one circumferential direction to a maximum number of revolutions substantially equal to the total number of cascade rings plus one.

3. A stop system according to claim 1 including means carried by and cooperable between said focusing ring, cascade rings, and stop ring for limiting the number of revolutions of said focusing ring in the opposite circumferential direction to a predetermined number of revolutions substantially proportional to the number of cascade rings plus one.

4. A stop system according to claim 1 wherein said limiting means includes a lug carried by each of said cascade rings and one of said focusing ring and said stop ring at predetermined circumferential positions thereabout and projecting therefrom in like axial directions, a shoulder carried by each of said cascade rings and the other of said focusing ring and said stop ring at predetermined circumferential positions thereabout for engagement with the lug carried by the axially adjacent ring, the rotation of said focusing ring in said one circumferential direction causing successive engagement between the lug and shoulder of each pair of axially adjacent rings whereby the first ring in each pair thereof rotates the second ring thereof upon said engagement and continued rotation of said focusing ring.

5. A stop system according to claim 4 wherein the successive engagement between the lug and shoulder of each pair of axially adjacent rings occurs upon completing substantially a full rotation of said first ring while the engagement between the lug and shoulder of the next pair of axially adjacent rings occurs upon completing substantially a full rotation of said second ring.

6. A stop system according to claim 4 wherein the rotation of said focusing ring in the opposite circumferential direction causes successive disengagement between the lug and shoulder of each pair of axially adjacent rings.

7. A stop system according to claim 6 wherein the successive disengagement between the lug and shoulder of each pair of axially adjacent rings occurs upon initial rotation of the first ring, the successive engagement between the lug and shoulder of each pair of axially adjacent rings occurring upon completing substantially a full rotation of said first ring subsequent to the disengagement between the lug and shoulder of said first and second rings.

8. A stop system according to claim 1 wherein said limiting means includes a lug carried by each of said focusing ring and cascade rings at predetermined circumferential positions thereabout and projecting therefrom in like axial directions toward said stop ring, a shoulder carried by each of said cascade rings and said stop ring at predetermined circumferential positions thereabout for engagement with the lug carried by the axially adjacent ring, the rotation of said focusing ring in said one circumferential direction causing successive engagement between the lug and shoulder of each pair of axially adjacent rings commencing with engagement between the lug carried by said focusing ring and the shoulder carried by the adjacent cascade ring and ending with the engagement between the lug carried by the cascade ring adjacent the stop ring and the shoulder carried by said stop ring.

9. A stop system according to claim 8 wherein rotation of said focusing ring in the opposite circumferential direction causes successive disengagement between the lug and shoulder of each pair of axially adjacent rings commencing with the engagement between the lug carried by said focusing ring and the shoulder carried by the adjacent cascade ring and ending with the disengagement between the lug carried by the cascade ring adjacent the stop ring and the shoulder carried by said stop ring.

10. A stop system according to claim 1 wherein said focusing ring includes a reduced diameter support tube projecting axially from one end thereof, said cascade rings being carried by and for rotation about said support tube.

11. A stop system according to claim 10 wherein said stop ring is secured to said second element adjacent the end of said support tube.

12. An optical instrument according to claim 1 wherein said limiting means includes a lug carried by each of said cascade rings and one of said focusing ring and said stop ring at predetermined circumferential positions thereabout and projecting therefrom in like axial directions, a shoulder carried by each of said cascade rings and the other of said focusing ring and said stop ring at predetermined circumferential positions thereabout for engagement with the lug carried by the axially adjacent ring, the rotation of said focusing ring in said one circumferential direction causing successive engagement between the lug and shoulder of each pair of axially adjacent rings whereby the first ring in each pair thereof rotates the second ring thereof upon said engagement and continued rotation of said focusing ring.

13. An optical instrument according to claim 12 wherein the successive engagement between the lug and shoulder of each pair of axially adjacent rings occurs upon completing substantially a full rotation of said first ring while the engagement between the lug and shoulder of the next pair of axially adjacent rings occurs upon completing substantially a full rotation of said second ring.

14. An optical instrument according to claim 12 wherein the rotation of said focusing ring in the opposite circumferential direction causes successive disengagement between the lug and shoulder of each pair of axially adjacent rings.

15. An optical instrument comprising:
a body tube;
a first lens carried by said body tube;
a housing telescopically received in said body tube;
a second lens carried by said housing;
an imaging device carried by said housing;
said first lens and said imaging device being carried respectively by said body tube and by said housing for movement relative to one another;
a focusing ring carried by said housing;
means cooperable between said focusing ring, said second lens and said imaging device for moving said second lens and said imaging device relative to the first lens in response to rotation of said focusing ring; and means including a plurality of rotatable cascade rings, a stop ring, and said focusing ring, each in coaxial alignment with the other, for limiting the number of revolutions of said focusing ring in at least one circumferential direction to a predetermined number of revolutions substantially proportional to the total number of cascade rings plus one.

16. An optical instrument according to claim 15 wherein said limiting means limits the number of revolutions of said focusing ring in said one circumferential direction to a maximum number of revolutions substantially equal to the total number of cascade rings plus one.

17. An optical instrument according to claim 15 including means carried by and cooperable between said focusing ring, cascade rings, and stop ring for limiting the number of revolutions of said focusing ring in the opposite circumferential direction to a predetermined number of revolutions substantially proportional to the number of cascade rings plus one.

18. An optical instrument according to claim 15 wherein said limiting means includes a lug carried by each of said focusing ring and cascade rings at predetermined circumferential positions thereabout and projecting therefrom in like axial directions toward said stop ring, a shoulder carried by each of said cascade rings and said stop ring at predetermined circumferential positions thereabout for engagement with the lug carried by the axially adjacent ring, rotation of said focusing ring in said one circumferential direction causing successive engagement between the lug and shoulder of each pair of axially adjacent rings commencing with engagement between the lug carried by said focusing ring and the shoulder carried by the adjacent cascade ring and ending with the engagement between the lug carried by the cascade ring adjacent the stop ring and the shoulder carried by said stop ring.

19. An optical instrument according to claim 18 wherein rotation of said focusing ring in the opposite circumferential direction causes successive disengagement between the lug and shoulder of each pair of axially adjacent rings commencing with the engagement between the lug carried by said focusing ring and the shoulder carried by the adjacent cascade ring and ending with the disengagement between the lug carried by the cascade ring adjacent the stop ring and the shoulder carried by said stop ring.

20. An optical instrument according to claim 15 wherein said housing includes a reduced diameter support tube projecting axially from one end thereof, said cascade rings being carried by and for rotation about said support tube.

* * * * *